United States Patent
Holmes et al.

(10) Patent No.: US 8,266,986 B2
(45) Date of Patent: Sep. 18, 2012

(54) TRANSMISSION HYDRAULIC CONTROL SYSTEM HAVING A DUAL ELEMENT PUMP

(75) Inventors: Alan G. Holmes, Clarkston, MI (US); Jy-Jen F. Sah, West Bloomfield, MI (US); Kevin Michael Dougan, Plymouth, MI (US); Norman Schoenek, Novi, MI (US); Michael R. Schmidt, Springfield, MO (US)

(73) Assignee: GM Global Technology Operations LLC, Detroit, MI (US)

( * ) Notice: Subject to any disclaimer, the term of this patent is extended or adjusted under 35 U.S.C. 154(b) by 429 days.

(21) Appl. No.: 12/689,689

(22) Filed: Jan. 19, 2010

(65) Prior Publication Data

US 2011/0173965 A1 Jul. 21, 2011

(51) Int. Cl.
*F16H 47/00* (2006.01)
(52) U.S. Cl. ............... 74/732.1; 74/731.1; 74/733.1
(58) Field of Classification Search .......... 74/730.1, 74/731.1, 732.1, 733.1
See application file for complete search history.

(56) References Cited

U.S. PATENT DOCUMENTS

| | | | |
|---|---|---|---|
| 6,361,287 B1 | 3/2002 | Hopper | |
| 6,944,529 B2 * | 9/2005 | Person et al. | 701/51 |
| 7,585,241 B2 * | 9/2009 | Tamba et al. | 475/53 |
| 7,951,043 B2 * | 5/2011 | Reisch et al. | 477/156 |
| 2011/0176932 A1 | 7/2011 | Schultz et al. | |

FOREIGN PATENT DOCUMENTS

| | | |
|---|---|---|
| DE | 2141564 A1 | 2/1973 |
| DE | 4320353 A1 | 1/1994 |
| DE | 19813982 A1 | 10/1999 |
| DE | 19857222 A1 | 6/2000 |
| DE | 10147123 A1 | 4/2002 |
| DE | 10327406 A1 | 2/2005 |
| DE | 102004001753 A1 | 8/2005 |
| DE | 102005006431 A1 | 8/2006 |
| EP | 157086 A1 | 10/1985 |
| EP | 1420185 A1 | 5/2004 |

* cited by examiner

*Primary Examiner* — Ha D. Ho

(57) ABSTRACT

A hydraulic control system for a transmission includes a motor, a sump for storing a hydraulic fluid, and a dual element pump connected to the motor. The dual element pump has at least one input port connected to the sump, a first outlet port, and a second outlet port. The dual element pump provides a first volume of hydraulic fluid to the first outlet port and provides a second volume of hydraulic fluid to the second outlet port. The first volume is greater than the second volume. The first outlet port is connected to a diversion valve. The second outlet port is connected to a high pressure hydraulic circuit. The diversion valve is operable to transmit the hydraulic fluid from the first outlet port to a low pressure hydraulic circuit and the high pressure hydraulic circuit.

19 Claims, 2 Drawing Sheets

TRANSMISSION HYDRAULIC CONTROL SYSTEM HAVING A DUAL ELEMENT PUMP

FIELD

Figure 1:
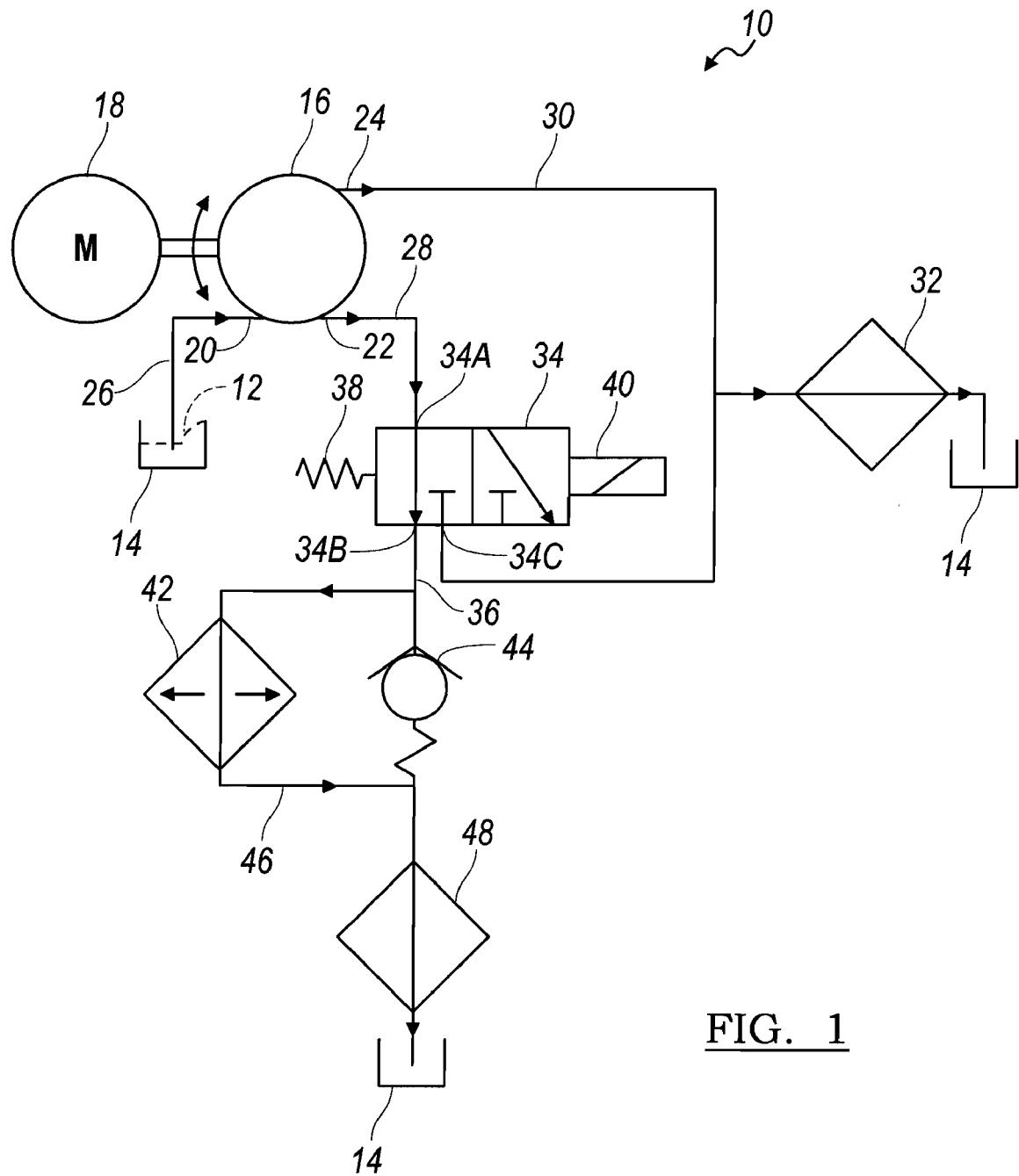

The present disclosure relates to a transmission hydraulic control system having a dual element pump, and more particularly to a transmission hydraulic control system having an electric dual element pump for simultaneously supplying hydraulic fluid to a high pressure circuit and a low pressure circuit.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes or synchronizers. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

These torque transmitting actuation systems, which may include rotating seal rings, valves, and solenoids may have low, though not zero, fluid leakage. Accordingly a minimum volume of hydraulic fluid must be provided to these systems. In addition, various subsystems within the hydraulic control system require different levels of pressurization and flow rates. While conventional hydraulic control systems are effective at dealing with the leakage and with the different hydraulic demands of various subsystems, there is room in the art for improved hydraulic control circuits that reduce the amount of complex components while improving efficiency and controllability of the system.

SUMMARY

A hydraulic control system for a transmission is provided. The transmission includes a plurality of torque transmitting devices. The hydraulic control system includes a motor, a sump for storing a hydraulic fluid, and a dual element pump connected to the motor. The dual element pump has at least one input port connected to the sump, a first outlet port, and a second outlet port. The dual element pump provides a first volume of hydraulic fluid to the first outlet port and provides a second volume of hydraulic fluid to the second outlet port. The first volume is greater than the second volume. A low pressure hydraulic circuit, a high pressure hydraulic circuit for actuating at least one of the plurality of torque transmitting devices, and a diversion valve is also provided. The diversion valve has an inlet port in communication with the first outlet port of the dual element pump, a first outlet port in communication with the low pressure hydraulic circuit, and a second outlet port in communication with the high pressure hydraulic circuit. The diversion valve is moveable between at least two positions including a first position and a second position. The inlet port of the diversion valve is in communication with the first outlet port of the diversion valve when in the first position and the inlet port of the diversion valve is in communication with the second outlet port of the diversion valve when in the second position. The diversion valve is in the second position under high flow demands in the high pressure circuit when at least one of the plurality of torque transmitting devices is actuated.

In one example of the hydraulic control system, the high pressure hydraulic circuit includes a gear selection subsystem operable to actuate at least one torque transmitting mechanism in the transmission.

In another example of the hydraulic control system, the low pressure hydraulic circuit includes a cooler subsystem operable to cool the hydraulic fluid and a lubrication subsystem for providing the hydraulic fluid throughout the transmission to lubricate a plurality of components within the transmission.

In another example of the hydraulic control system, a bypass valve is in parallel relationship with the cooler subsystem, wherein the bypass valve includes an open position that allows the hydraulic fluid communicated from the first outlet port of the dual element pump to bypass the cooler subsystem when a pressure of the hydraulic fluid upstream of the bypass valve is greater than a threshold pressure.

In another example of the hydraulic control system, the dual element pump includes a first pump and a second pump, wherein the first pump communicates hydraulic fluid to the first outlet port and the second pump communicates hydraulic fluid to the second outlet port.

In another example of the hydraulic control system, both the first pump and the second pump are driven by the motor.

In another example of the hydraulic control system, the first pump is driven by the motor and the second pump is driven by a second motor.

In another example of the hydraulic control system, the diversion valve is biased between the first position and the second position by a spring and a solenoid.

In another example of the hydraulic control system, the first outlet port of the dual element pump provides the minimum pressure required for cooling and lubrication and the second outlet port of the dual element pump provides the minimum pressure required by the torque transmitting devices.

In another example of the hydraulic control system, the motor is an electric motor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
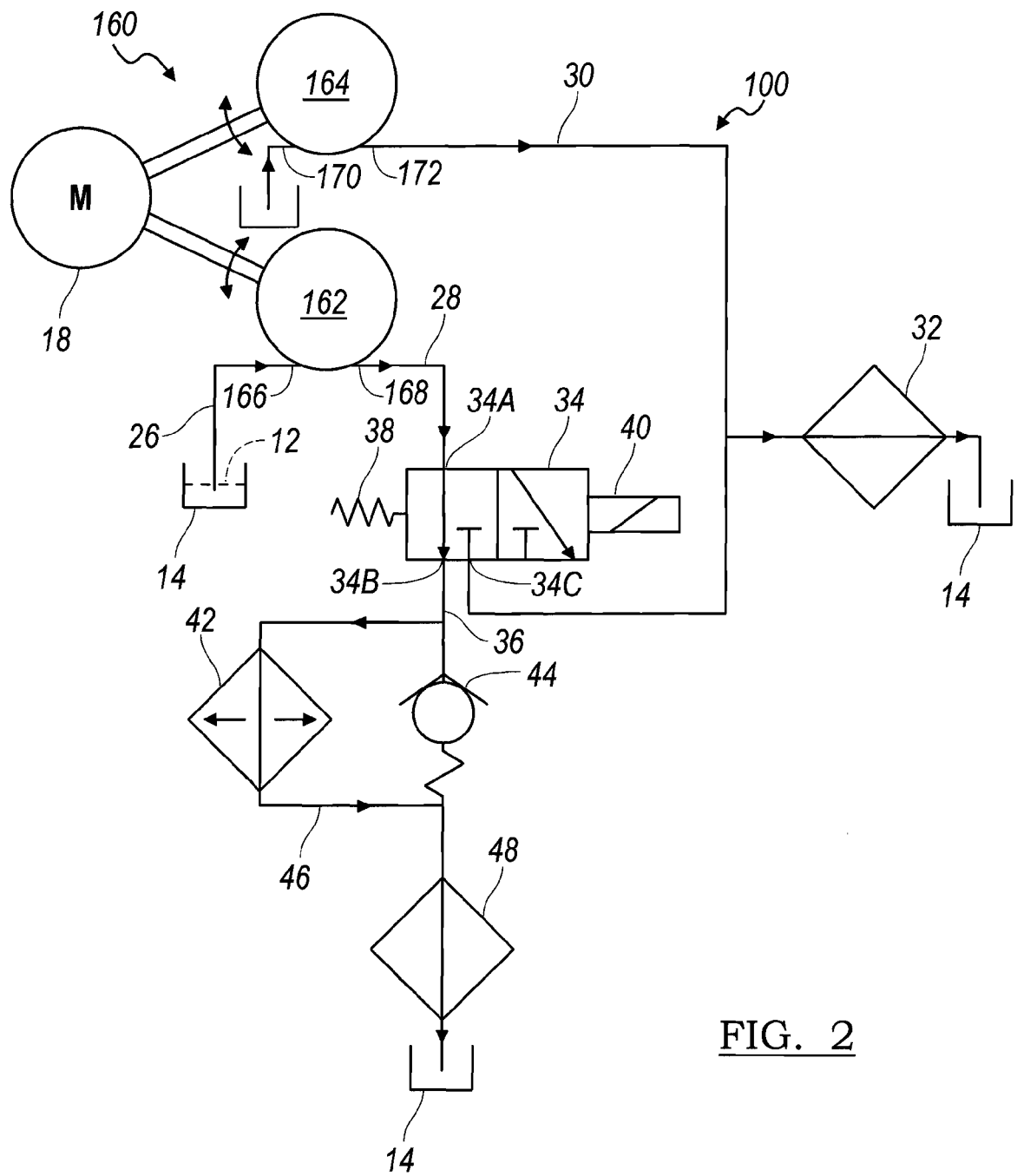

FIG. 1 is a schematic flow diagram of an example of a hydraulic control system according to the principles of the present disclosure; and FIG. 2 is a schematic flow diagram of another example of a hydraulic control system according to the principles of the present disclosure.

DETAILED DESCRIPTION

The following description is merely exemplary in nature and is not intended to limit the present disclosure, application, or uses.

With reference to FIG. 1, a schematic flow diagram of an exemplary hydraulic control system for a transmission is generally indicated by reference number 10. The hydraulic control system 10 of the present invention is operable to control, lubricate, and cool the transmission by selectively communicating a hydraulic fluid 12 from a sump 14 to a plurality of subsystems, as will be described in greater detail below. The sump 14 is a tank or reservoir preferably disposed at the bottom of the transmission to which the hydraulic fluid 14 returns and collects from various components and regions of the transmission. The hydraulic fluid 12 is forced from the sump 14 and communicated throughout the hydraulic control system 10 via a dual element pump 16. The dual element pump 16 is preferably driven by an electric motor 18. The dual element pump 16 may be, for example, a gear pump, a vane pump, or any other positive displacement pump. Alternatively, the dual element pump 16 may be comprised of separate pumps, as described in regards to FIG. 2. below, driven by the electric motor 18 or separate pumps driven by separate electric motors 18. The dual element pump 16 includes an inlet port 20, or two inlet ports consisting of inlet port 20 and a second inlet port also communicating a hydraulic fluid 12 from a sump 14, a first outlet port 22 in communication with the large displacement section of the dual element pump 16, and a second outlet port 24 in communication with the small displacement section of the dual element pump 16. The inlet port 20 communicates with the sump 14 via a suction line 26. The first outlet port 22 is a high volume, normally low pressure outlet port that communicates pressurized hydraulic fluid 12 to a supply line 28. The second outlet port 24 is a low volume, normally high pressure outlet port that communicates pressurized hydraulic fluid 12 to a main line 30. In the example provided, the first outlet port 22 of the dual element pump 16 provides the minimum pressure required for cooling and lubrication and the second outlet port 24 of the dual element pump 16 provides the minimum pressure required for the torque transmitting devices.

The main line 30 is in communication with a gear selection subsystem 32 and a diversion valve 34. The gear selection subsystem 32 is a hydraulic circuit that includes at least two branches that feed a plurality of shift actuators. In the case of a dual clutch transmission, the shift actuators include at least two clutch actuators that each include a hydraulically actuated piston and housing assembly. Actuation of the piston in turn engages or disengages one of the clutches in the dual clutch. It should be appreciated that the gear selection subsystem 32 may be used to actuate other torque transmitting devices, such as synchronizers and brakes, without departing from the scope of the present invention. Each branch that communicates the pressurized hydraulic fluid 12 from the main line 30 to the shift actuators may include on/off solenoids, three-port pressure control valves or solenoids, one or more valves to prevent unwanted torque transmitting device actuation, and pressure sensors. Hydraulic fluid 12 communicated to the gear selection subsystem 32 via the main line 30 selectively exhausts back to the sump 14.

The supply line 28 is in communication with the diversion valve 34. The diversion valve 34 may be of various types and configurations, such as a spool valve, but is a two position valve assembly that includes at least an inlet port 34A, a first outlet port 34B, and a second outlet port 34C. It should be appreciated that the diversion valve 34 may include other ports, including exhaust and control ports, without departing from the scope of the present disclosure. The inlet port 34A is in communication with the supply line 28. The first outlet port 34B is in communication with a cooler supply line 36. The second outlet port 34C is in communication with the main line 30.

When the diversion valve 34 is moveable between the first and second positions by a biasing member 38, such as a spring, and a solenoid 40. The biasing member 38 engages the diversion valve 34 at an end of the diversion valve 34 opposite the solenoid 40. The biasing member 38 biases the diversion valve 34 to a de-stroked position, shown schematically in FIG. 1. When the diversion valve 34 is in the de-stroked position, inlet port 34A is in fluid communication with the first outlet port 34B and the second outlet port 34C is isolated. The solenoid 40, which may be a direct acting solenoid or an on/off solenoid that communicates a hydraulic fluid to engage the diversion valve 34, moves the diversion valve 34 to a stroked position against the bias force of the biasing member 38. The diversion valve 34 may also be a spool valve with a hydraulic fluid generated by some method other than from a solenoid acting on the opposite end of the spool valve from the biasing member 38. When the diversion valve 34 is in the stroked position, the inlet port 34A is in fluid communication with the second outlet port 34C and the first outlet port 34B is isolated or allowed to exhaust to the sump 14.

The cooler supply line 36 is in communication with a cooler subsystem 42 and a one-way spring bypass valve 44 disposed in parallel with the cooler subsystem 42. The cooler subsystem 42 is a hydraulic circuit that includes an oil cooler to reduce the temperature of the hydraulic fluid 12. The one-way spring bypass valve 44 allows hydraulic fluid 12 to bypass the cooler subsystem 42 in the event of inadequate cooler flow. The one-way spring bypass valve 44 is set at a predetermined pressure and if the pressure of the hydraulic fluid 12 in the cooler supply line 36 exceeds this pressure, the one-way spring bypass valve 44 opens momentarily to increase the flow of hydraulic fluid 12. Both the cooler subsystem 42 and the one-way spring bypass valve 44 are in communication with a lubrication supply line 46. The lubrication supply line 46 communicates hydraulic fluid 12 to a lubrication and cooling subsystem 48. The lubrication and cooling subsystem 48 generally includes various fluid lines, passages, and other components used to deliver the hydraulic fluid 12 to various components within the transmission. The hydraulic fluid 12 then communicates back to the sump 14.

The operation of the hydraulic control system 10 will now be described in greater detail. During typical operating conditions, the electric motor 18 drives the dual element pump 16. Controlling the speed of the electric motor 18 allows the control of pump speed and torque of the dual element pump 16, thereby allowing for direct control of the line pressure (i.e. pressure of the hydraulic fluid 12 within the main line 30) and the lube pressure (i.e. pressure of the hydraulic fluid 12 within the lubrication supply line 36). The dual element pump 16 allows separate pressures to be delivered simultaneously to the gear selection system 32 and to the cooler and lubrication subsystems 42 and 48. For example, low volume, high pressure hydraulic fluid 12 is communicated out of the second outlet port 24 of the dual element pump 16 to the gear selection subsystem 32 via the main line 30. The high pressure hydraulic fluid 12 is then used to actuate the torque transmitting devices of the transmission. High volume, low pressure hydraulic fluid 12 is also communicated out of the first outlet port 22 to the diversion valve 34 via the supply line 28. When the diversion valve 34 is in the de-stroked position, the high volume, low pressure hydraulic fluid 12 is communicated to the cooler and lubrication subsystems 42 and 48 via the cooler supply line 36 and the lubrication supply line 46.

During shift events, the diversion valve 34 is moved to the stroked position by the solenoid 40. Accordingly, the high volume, low pressure hydraulic fluid 12 communicated from the supply line 28 is diverted from the cooler and lubrication subsystems 42 and 48 to the gear selection subsystem 32 via the main line 30. Therefore, the combined output from the dual element pump 16 is used to shift the torque transmitting devices within the gear selection subsystem 32.

During low-temperature operation, highly viscous, cold hydraulic fluid 12 within the cooler subsystem 42 creates a back pressure that can increase the pressure of the hydraulic fluid 12 within the cooler supply line 36. Under this back pressure, the one-way spring bypass valve 44 opens thereby diverting hydraulic fluid flow from the cooler subsystem 42 and eliminating the back pressure condition. Accordingly, the electric motor 18 is operating only the small-displacement section of the dual element pump 16 against high back pressure of the cold hydraulic fluid 12 within the main line 30 and the gear selection subsystem 32. This allows the dual element pump 16 to attain a high speed so that the electric motor 18 will operate at a favorable condition for high power, such as for the initial charging of the torque transmitting devices during engine cold-start and drive away.

The hydraulic control system 10 provides an increase in fuel economy of about 0.5 miles per gallon for a small vehicle hybrid and save 50 watts in electrical energy by minimizing hydraulic losses.

Turning now to FIG. 2, another example of a hydraulic control system according to the principles of the present invention is generally indicated by reference number 100. The hydraulic control system 100 is substantially similar to the hydraulic control system 10 shown in FIG. 1 and therefore like components are indicated by like reference numbers. However, the hydraulic control system 100 includes a dual element pump 160 that includes a first pump 162 and a second pump 164. The first pump 162 is preferably a high volume pump supplying, for example, 6 cc/rev of hydraulic fluid 12. The first pump 162 includes an inlet port 166 in communication with the sump 14 and an outlet port 168 in communication with the supply line 28. The second pump 164 is preferably a low volume pump supplying, for example, 1 cc/rev of hydraulic fluid 12. The second pump 164 includes an inlet port 170 in communication with the sump 14 and an outlet port 172 in communication with the main line 30. The first pump 162 is used to supply high volume hydraulic fluid to the cooler and lubrication subsystems 42 and 48 while the second pump 164 is used to supply the line pressure to the main line 30.

The description of the invention is merely exemplary in nature and variations that do not depart from the gist of the invention are intended to be within the scope of the invention. Such variations are not to be regarded as a departure from the spirit and scope of the invention.

We claim the following:

1. A hydraulic control system for a transmission, the transmission having a plurality of torque transmitting devices, the hydraulic control system comprising:
a motor;
a sump for storing a hydraulic fluid;
a dual element pump connected to the motor, the dual element pump having at least one input port connected to the sump, a first outlet port, and a second outlet port, wherein the dual element pump provides a first volume of hydraulic fluid from the first outlet port and provides a second volume of hydraulic fluid from the second outlet port, and wherein the first volume is greater than the second volume;
a low pressure hydraulic circuit;
a high pressure hydraulic circuit for actuating at least one of the plurality of torque transmitting devices; and
a diversion valve having an inlet port in communication with the first outlet port of the dual element pump, a first outlet port in communication with the low pressure hydraulic circuit, and a second outlet port in communication with the high pressure hydraulic circuit, wherein the diversion valve is moveable between at least two positions including a first position and a second position, wherein the inlet port of the diversion valve is in communication with the first outlet port of the diversion valve when in the first position and wherein the inlet port of the diversion valve is in communication with the second outlet port of the diversion valve when in the second position, and
wherein the diversion valve is in the second position when at least one of the plurality of torque transmitting devices is actuated.

2. The hydraulic control system of claim 1 wherein the high pressure hydraulic circuit includes a gear selection subsystem operable to actuate at least one torque transmitting mechanism in the transmission.

3. The hydraulic control system of claim 1 wherein the low pressure hydraulic circuit includes a cooler subsystem operable to cool the hydraulic fluid and a lubrication subsystem for providing the hydraulic fluid throughout the transmission to lubricate a plurality of components within the transmission.

4. The hydraulic control system of claim 3 further comprising a bypass valve in parallel relationship with the cooler subsystem, wherein the bypass valve includes an open position that allows the hydraulic fluid communicated from the first outlet port of the dual element pump to bypass the cooler subsystem when a pressure of the hydraulic fluid upstream of the bypass valve is greater than a threshold pressure.

5. The hydraulic control system of claim 1 wherein the dual element pump includes a first pump and a second pump, wherein the first pump communicates hydraulic fluid to the first outlet port of the dual element pump and the second pump communicates hydraulic fluid to the second outlet port of the dual element pump.

6. The hydraulic control system of claim 5 wherein both the first pump and the second pump are driven by the motor.

7. The hydraulic control system of claim 5 wherein the first pump is driven by the motor and the second pump is driven by a second motor.

8. The hydraulic control system of claim 1 wherein the diversion valve is biased between the first position and the second position by a spring and a solenoid.

9. The hydraulic control system of claim 1 wherein the diversion valve is biased between the first position and the second position by a spring and a hydraulic fluid.

10. The hydraulic control system of claim 1 wherein the first outlet port of the dual element pump provides a minimum pressure required for cooling and lubrication and the second outlet port of the dual element pump provides a minimum pressure required for operation of the plurality of torque transmitting devices.

11. The hydraulic control system of claim 1 wherein the motor is an electric motor.

12. A hydraulic control system for a transmission, the transmission having a plurality of torque transmitting devices, the hydraulic control system comprising:
an electric motor;
a sump for storing a hydraulic fluid;

a dual element pump connected to the electric motor, the dual element pump having at least one input port connected to a sump, a first outlet port, and a second outlet port, wherein the dual element pump provides a first volume of hydraulic fluid from the first outlet port and provides a second volume of hydraulic fluid from the second outlet port, and wherein the first volume is greater than the second volume;

a gear selection subsystem operable to actuate at least one torque transmitting mechanism in the transmission;

a cooler subsystem operable to cool the hydraulic fluid;

a lubrication subsystem for operable to lubricate the transmission;

a diversion valve having an inlet port in communication with the first outlet port of the dual element pump, a first outlet port in communication with the cooler subsystem and the lubrication subsystem, and a second outlet port in communication with the gear selection subsystem, wherein the diversion valve is moveable between at least two positions including a first position and a second position, wherein the inlet port of the diversion valve is in communication with the first outlet port of the diversion valve when in the first position and wherein the inlet port of the diversion valve is in communication with the second outlet port of the diversion valve when in the second position, wherein the diversion valve is in the second position when the torque transmitting devices are actuated.

13. The hydraulic control system of claim 12 further comprising a bypass valve in parallel relationship with the cooler subsystem, wherein the bypass valve includes an open position that allows the hydraulic fluid communicated from the first outlet port of the dual element pump to bypass the cooler subsystem when a pressure of the hydraulic fluid upstream of the bypass valve is greater than a threshold pressure.

14. The hydraulic control system of claim 12 wherein the dual element pump includes a first pump and a second pump, wherein the first pump communicates hydraulic fluid to the first outlet port of the dual element pump and the second pump communicates hydraulic fluid to the second outlet port of the dual element pump.

15. The hydraulic control system of claim 12 wherein both the first pump and the second pump are driven by the electric motor.

16. The hydraulic control system of claim 12 wherein the first pump is driven by the electric motor and the second pump is driven by a second electric motor.

17. The hydraulic control system of claim 12 wherein the diversion valve is biased between the first position and the second position by a spring and a solenoid.

18. The hydraulic control system of claim 12 wherein the diversion valve is based between the first position and the second position by a spring and a hydraulic fluid.

19. The hydraulic control system of claim 12 wherein the first outlet port of the dual element pump provides a minimum pressure required for cooling and lubrication and the second outlet port of the dual element pump provides a minimum pressure required to operate the plurality of torque transmitting devices.

* * * * *